April 1, 1941.	R. A. THOMPSON	2,236,955
LAWN EDGE TRIMMER
Filed Feb. 24, 1940
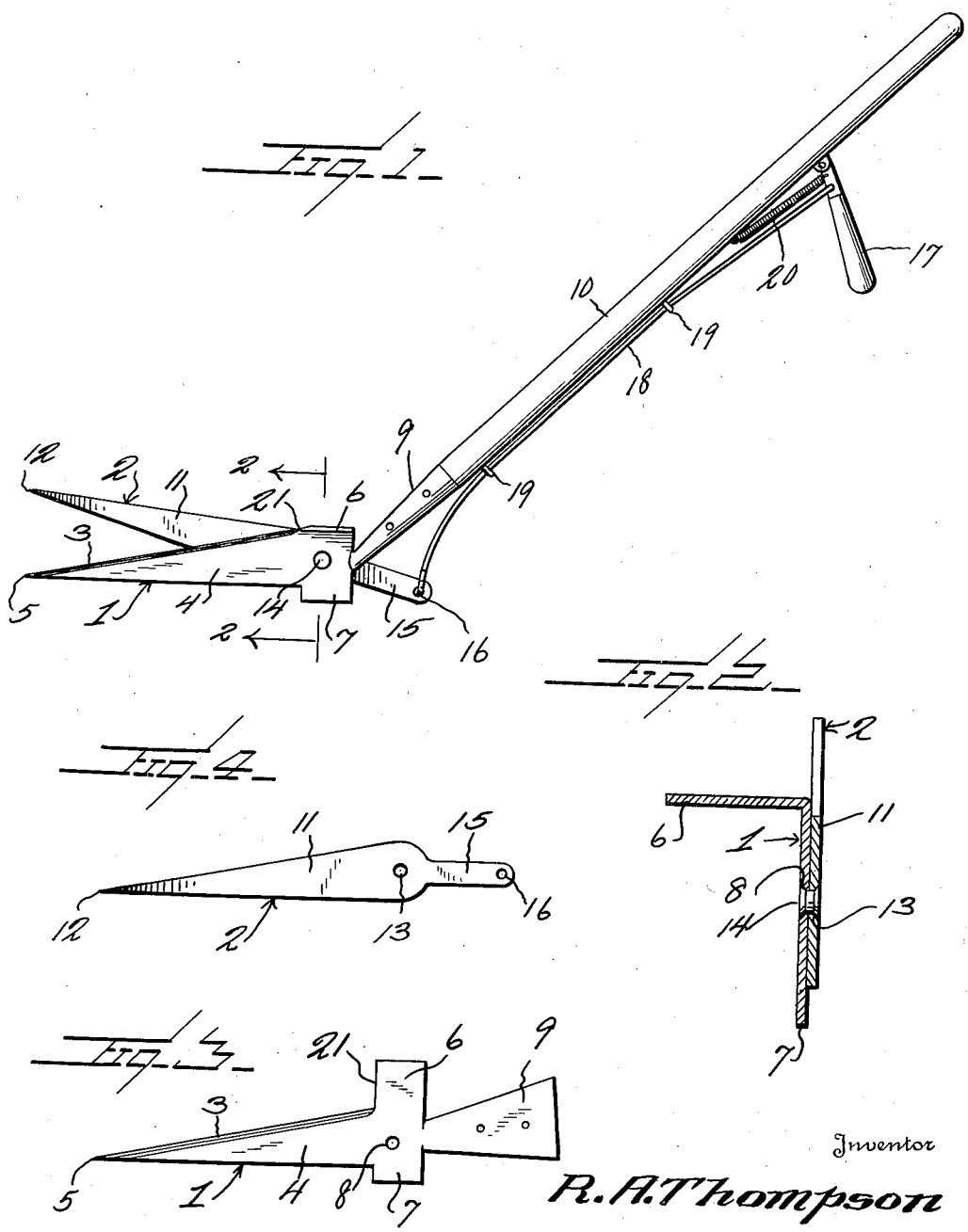
Inventor
R. A. Thompson
By Watson E. Coleman
Attorney Patented Apr. 1, 1941

2,236,955

UNITED STATES PATENT OFFICE 2,236,955

LAWN EDGE TRIMMER

Robert A. Thompson, Pampa, Tex.

Application February 24, 1940, Serial No. 320,670

4 Claims. (Cl. 30—248)

This invention relates generally to the class of cutting implements and pertains particularly to an improved form of lawn edge trimmer.

The present invention has for its primary object to provide a novel lawn edge trimmer which is so designed that it may be effectively employed for cutting grass along an edge bordering a walk or driveway without requiring the operator to stoop over, thereby making it possible to perform such trimming operation without undue strain upon the operator's back.

A further object of the invention is to provide a lawn edge trimmer employing a pair of relatively movable cutting blades together with a control handle connected therewith wherein a means is employed for maintaining such cutting blades in a suitable working relation with the edge of an adjacent walk or curbing so that the lower one of the blades will not be caused to penetrate too deeply into the turf and thereby interfere with the easy working of the device, and whereby a support or fulcrum is provided which assists the operator in working the cutter when it becomes necessary to apply an extreme amount of force for the actuation of the blades.

A still further object of the invention is to provide in a lawn edge trimmer of the character stated, novel means associated with one of two relatively movable cutting blades for forming a channel or groove in the sod behind the cutter for the reception of a movable part of the device whereby such movable part is permitted to function easily and without interference from underlying grass or sod.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the trimming device embodying the present invention.

Fig. 2 is a sectional view on the line 2—2 of Fig. 1.

Fig. 3 is a view in plan of the blank for the fixed blade and attached parts.

Fig. 4 is a view in plan of the movable blade.

Referring now more particularly to the drawing, the numeral 1 generally designates what will be referred to as the fixed or lower blade of the trimmer while the numeral 2 designates the upper or movable blade. The blades of the present device are disposed to work in a vertical plane and the lower or fixed blade, when in working position, has its sharpened or cutting edge 3 directed upwardly.

The lower blade 1 comprises the elongated body portion 4 tapered to form the point 5 at the front end while at its rear end it is provided with the guide bracket 6, which forms an integral part of the metal piece from which the blade is shaped and which extends laterally from the top edge of such piece. In other words, the guide bracket 6 extends laterally from the rear end of the sharpened edge of the blade. Directly beneath the portion of the blade to which the lateral guide bracket 6 is connected is a downwardly extending ear 7 which functions as a groove or channel former, for the purpose hereinafter stated, and on substantially the longitudinal center of the blade body 4 there is formed a bolt or rivet aperture 8.

Integrally formed with the blade 4 is the socket 9 which initially constitutes a flat sheet of material which is subsequently rolled to form the socket in which is received one end of a wooden handle 10. The socket is angled to extend obliquely of the longitudinal center of the fixed blade and upwardly therefrom so that the handle 10 extends upwardly and rearwardly as illustrated, at an angle which is convenient to enable a person to operate the trimmer while standing erect.

The movable blade 2 is of substantially the same form as the fixed blade 1 and consists of the elongated flat body 11 which is tapered to a point 12 at its forward end and which adjacent its rear end has an aperture 13 which alines with the aperture 8 of the fixed blade to receive a rivet or pivot bolt 14. Extending integrally from the rear end of the movable blade 11 is a downwardly curved arm 15 terminating in an eye 16 at its free end. The heads of the connecting rivet 14 are countersunk in the adjacent blades so that they will not pick up blades of grass or other material.

Adjacent the upper or free end of the handle 10 there is pivotally attached the auxiliary handle 17 and connecting this auxiliary handle with the arm or lever 15 is a stiff wire or cable 18 which passes through suitable guide eyes 19 carried by the handle 10. A contractile spring 20 connects the auxiliary handle 17 adjacent its pivoted end with the handle 10 forwardly of the pivot for the handle 17 and constantly urges the handle 17 in a direction to shift the movable blade 2 into opened position with respect to the fixed blade 1.

The forward edge of the flat guide bracket 6 is beveled or sharpened slightly at 21, so that this edge will function to pass under and break up ends of grass which have grown over the edge and onto the top of the walk or curb along which the guide bracket may be moving.

In the use of the present implement, the guide bracket 6 extends laterally over the top of the walk or curbing at the edge thereof while the lower blade 1 positions between such walk edge and the turf. The ear 7 extends downwardly into the turf and as the cutting implement is moved along the edge of the walk while operating the blade 2 to cut the grass in conjunction with the fixed blade 1, the guide bracket serves as a steadying and guide means for the cutter and it also serves to pass under and pull loose any blades of grass or other growth which may have adhered to the surface of the walk. The ear 7 forms a channel or groove in the turf which permits the free swinging movement of the actuating lever or arm 15 so that this arm will not be interfered with in its movements. As will be readily understood, the blade 2 is controlled by oscillation of the auxiliary handle 17 so as to impart the necessary movements to the arm 15 through the stiff cable or rod 18.

What is claimed is:

1. An edge trimmer of the character stated, comprising a pair of cutting blades arranged in crossed relation and coupled together for relative oscillation on a horizontal axis, a handle, means for attaching said handle at one end to one of said blades whereby the said one blade is fixed with respect to the handle, means carried by the handle and coupled with the other blade for imparting movement thereto relative to the fixed blade, and a plate comprising a lateral continuation of the top edge of said fixed blade adjacent the rear end of the same and functioning as a walk engaging guide bracket for the implement.

2. A lawn edge trimmer, comprising two relatively long flat blades each having a pointed forward end and a relatively wide rear end, said blades when in use having their flat sides vertically disposed and having their rear ends in side by side crossed relation, pivotal means between said rear ends whereby the blades may move relatively on a horizontal axis, one of said blades having an integral upwardly and rearwardly extending socket, a handle having an end secured in said socket whereby the said one of the blades becomes fixed with respect to the handle, the other one of the blades being movable relative to the fixed blade, a lever arm extending rearwardly and downwardly from the movable blade, an auxiliary handle pivotally attached to the fixed handle, and a stiff operating connection between said lever and said auxiliary handle whereby movement may be imparted to the movable blade.

3. A lawn trimmer, comprising a pair of relatively long blades disposed in side by side relation and having crossed rear end portions, a pivotal connection between said rear end portions whereby one blade has pivotal movement on a horizontal axis relative to the other blade, a handle connected at one end to the said other blade and extending upwardly therefrom, means carried by the handle and operatively coupled with the movable blade for imparting movement thereto on said pivotal connection, a guide bracket carried by and extending laterally from the said other blade for engagement with the top edge of an adjacent walk and said guide bracket having a forward beveled edge.

4. A lawn edge trimmer, comprising two relatively long flat blades each having a pointed forward end and a relatively wide rear end, said blades when in use having their flat sides vertically disposed and having their rear ends in side by side crossed relation, pivotal means between said rear ends whereby the blades may move relatively on a horizontal axis, one of said blades having an integral upwardly and rearwardly extending socket, a handle having an end secured in said socket whereby the said one of the blades becomes fixed with respect to the handle, the other one of the blades being movable relative to the fixed blade, a lever arm extending rearwardly and downwardly from the movable blade, an auxiliary handle pivotally attached to the fixed handle, a stiff operating connection between said lever and said auxiliary handle whereby movement may be imparted to the movable blade, and an earth penetrating ear integral with and extending downwardly from the lower edge of the fixed blade adjacent the rear end thereof for forming a ground groove in advance of said lever arm.

ROBERT A. THOMPSON.